United States Patent
Yomazzo et al.

(10) Patent No.: US 7,033,236 B1
(45) Date of Patent: *Apr. 25, 2006

(54) SURFBOARD

(75) Inventors: Michael J. Yomazzo, Newtown, CT (US); Jeffrey R. Esposito, East Hampton, NY (US)

(73) Assignee: MX3 Sports, LLC, New Milford, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 10/924,435

(22) Filed: Aug. 23, 2004
(Under 37 CFR 1.47)

Related U.S. Application Data (63) Continuation-in-part of application No. 10/345,838, filed on Jan. 16, 2003, now Pat. No. 6,779,478.

(60) Provisional application No. 60/349,150, filed on Jan. 16, 2002.

(51) Int. Cl.
*B63B 1/00* (2006.01)

(52) U.S. Cl. .................................. 441/74; 114/357

(58) Field of Classification Search ............ 441/74, 441/65; 114/357

See application file for complete search history.

(56) References Cited

U.S. PATENT DOCUMENTS

| | | | |
|---|---|---|---|
| 2,513,857 A | 4/1950 | Friedrich | 9/11 |
| 3,337,886 A | 8/1967 | Ekstrom | 9/310 |
| D221,262 S | 7/1971 | Marshall | D71/1 |
| 3,782,745 A | 1/1974 | Stoveken | 280/18 |
| 4,285,082 A | 8/1981 | Cox | 9/310 |
| 4,804,347 A | 2/1989 | Ross | 441/79 |
| 5,000,710 A | 3/1991 | Bedortha et al. | 441/129 |
| 5,348,505 A | 9/1994 | Rothhammer | 441/117 |
| 5,514,017 A | 5/1996 | Chimiak | 441/65 |
| 5,658,179 A | 8/1997 | Glydon et al. | 441/74 |
| 5,851,462 A * | 12/1998 | Chen | 264/55 |
| 5,928,045 A | 7/1999 | Szabad | 441/74 |
| 6,068,531 A | 5/2000 | Patterson | 441/74 |
| 6,189,932 B1 | 2/2001 | Kaufman | 281/37 |
| 6,241,568 B1 | 6/2001 | Simms | 441/74 |
| D455,186 S | 4/2002 | Koester | D21/769 |

* cited by examiner

*Primary Examiner*—Stephen Avila
(74) *Attorney, Agent, or Firm*—Harrington & Smith, LLP (57) ABSTRACT

A method for manufacturing a surfboard includes providing a first member having a general surfboard shape, the first member comprising high-density ethyl vinyl acetate; locating a second member on a first exterior side of the first member, wherein the second member comprises polyethylene and has a relatively thin layer shape; heating the first and second members to bond the polyethylene second member to the high-density ethyl vinyl acetate first member; and after the second member has been bonded to the first member, cooling the first and second members.

16 Claims, 6 Drawing Sheets

FIG.9

SURFBOARD

CROSS REFERENCE TO RELATED APPLICATIONS

This is a continuation-in-part application of U.S. patent application Ser. No. 10/345,838 filed Jan. 16, 2003, now U.S. Pat. No. 6,779,478, which claims priority under 35 U.S.C. §119(e) on U.S. provisional patent application No. 60/349,150 filed Jan. 16, 2002, which are hereby incorporated by reference in their entireties.

BACKGROUND OF THE INVENTION

1. Field of the Invention

The present invention relates to a surfboard or similar sports board, and method of manufacturing a surfboard or similar sports board.

2. Brief Description of Prior Developments

U.S. Pat. No. 5,928,045 discloses a sports board having a foam core, and a deck layer, a bottom layer and an outer rail which cover the foam core. U.S. Pat. No. 3,337,886 discloses a surfboard having a core of foam material and an outer skin or shell.

There is a desire to provide a surfboard which is lightweight, but nonetheless durable to resist breaking. There is also a desire to provide a surfboard with a relatively soft perimeter or bumper which can help reduce the force of an impact with a user.

SUMMARY OF THE INVENTION

In accordance with one method of the present invention, a method for manufacturing a surfboard is provided including providing a first member having a general surfboard shape, the first member comprising high-density ethyl vinyl acetate; locating a second member on a first exterior side of the first member, wherein the second member comprises polyethylene and has a relatively thin layer shape; heating the first and second members to bond the polyethylene second member to the high-density ethyl vinyl acetate first member; and after the second member has been bonded to the first member, cooling the first and second members.

In accordance with another method of the present invention, a method for manufacturing a surfboard is provided comprising providing a core member having a general surfboard shape; locating at least one cover member on opposite first and second major sides of the core member, wherein the at least one cover member is comprised of a different material than the core member; and heating the core and cover members to bond the at least one cover member to the core member. At least a portion of a side edge of the core member extends outward past the at least one cover member.

In accordance with one aspect of the present invention, a surfboard is provided comprising a high-density ethyl vinyl acetate core member; a first polyethylene cover member bonded to a first side of the core member; and a second polyethylene cover member bonded to a second opposite side of the core member. A side edge of the core member extends from between the first and second cover members and past the first and second cover members to form a perimeter edge of the surfboard.

In accordance with another aspect of the present invention, a surfboard is provided comprising a core member; a first cover member bonded to a first side of the core member; and a second cover member bonded to a second opposite side of the core member. The first and second cover members are comprised of a different harder material than the core member. A side edge of the core member extends from between the first and second cover members and past the first and second cover members to form a relatively soft perimeter edge portion of the surfboard.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENTS

Figure 1:
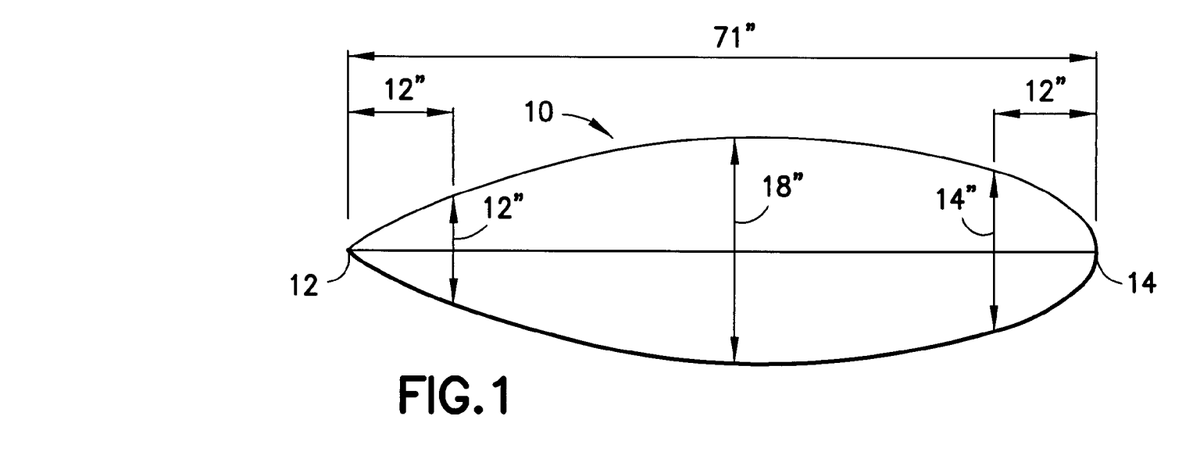
FIG. 1 is a top view of a surfboard incorporating features of the present invention.

Referring to FIG. 1, there is shown top plan view of a surfboard 10 incorporating features of the present invention. Although the present invention will be described with reference to the exemplary embodiments shown in the drawings, it should be understood that the present invention can be embodied in many alternate forms of embodiments. In addition, any suitable size, shape or type of elements or materials could be used.

The present invention relates, generally, to a surfboard which can provide its rider with greater maneuverability than conventional surfboards, and a method for its manufacture. The present invention can provide a novel surfboard that yields to its user greater maneuverability, while still cost-effective to manufacture and economical for ultimate retail purchase. The surfboard can be made of ethyl vinyl acetate and polyethylene.

The surfboard of the invention can be made by cutting high-density ethyl vinyl acetate to the shape of a conventional surfboard, which can then be at least partially wrapped or covered in a protective polyethylene acetate (PE) shell, cover(s) or layer(s). Thereafter, the surfboard can be heated for an appropriate time, such as approximately fifteen minutes, at a temperature sufficient for bonding the polyethylene to the high-density ethyl vinyl acetate (EVA). In one preferred embodiment the board is heated between 20–30 minutes. However, any suitable time period could be provided, such as selecting the time period based upon the thickness of the board, so long as the PE layer(s) bond with the EVA core. Once bonding is complete, the surfboard can then be cooled and, if necessary, sculptured to its final shape. The final shape of the surfboard may be that of any conventional surfboard otherwise known to the skill artisan and may include a "kicktail".

The surfboard of the present invention can be both more sleek than conventional surfboards, thereby improving rider's performance, enjoyment and maneuverability, as well as more efficient and economical to manufacture. Other features of the present invention will become apparent when considered in combination with the accompanying drawing figures which illustrate certain preferred embodiments of the present invention. It should, however, be noted that the accompanying drawing figures are intended to illustrate only certain embodiments of the claimed invention and are not intended as a means for defining the limits and scope of the invention.

Turning now, in detail, to an analysis of the drawing figures, FIG. 1 is a top plan view of the surfboard 10 of the invention, which shows one embodiment with preferred dimensions for that embodiment. In the embodiment shown, the surfboard is 71 inches at its longest point, and 18.5 inches wide at its center. The front end of surfboard 10, is designated by reference numeral 12, while its rear end, having a kicktail (shown best in FIG. 2), is denoted by numeral 14. However, in a preferred embodiment the kicktail is not provided. In alternate embodiments, any suitable dimensions could be provided. In one embodiment the board is intended to be used as a beginner or learner board. In that case, the board would be longer and wider for greater stability.

Figure 2:
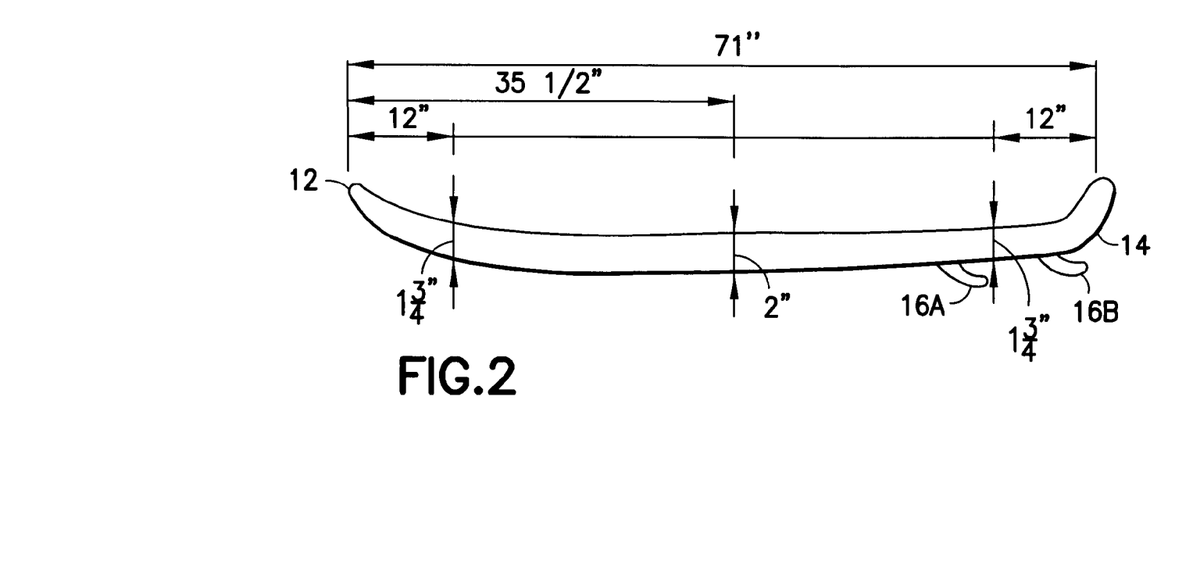
FIG. 2 is a left-side elevational view of the surfboard shown in FIG. 1, a right-side elevational view being a mirror image thereof.

FIG. 2 is a left-side elevational view of surfboard 10 of FIG. 1, showing a central thickness of, preferably, two inches. The thickness of the surfboard, preferably, diminishes to approximately 1.75 inches near the front and rear of the surfboard. In FIG. 2, this preferred thickness exists at both 12 inches from the front end 12 and rear end 14 of surfboard 10. Finally, in FIG. 2, fins 16A, 16B for the surfboard are visible. A core of the surfboard is, preferably, made of high-density ethyl vinyl acetate and is wrapped or covered at predetermined areas with one or more polyethylene members.

Figures 3A, 3B, 3C:
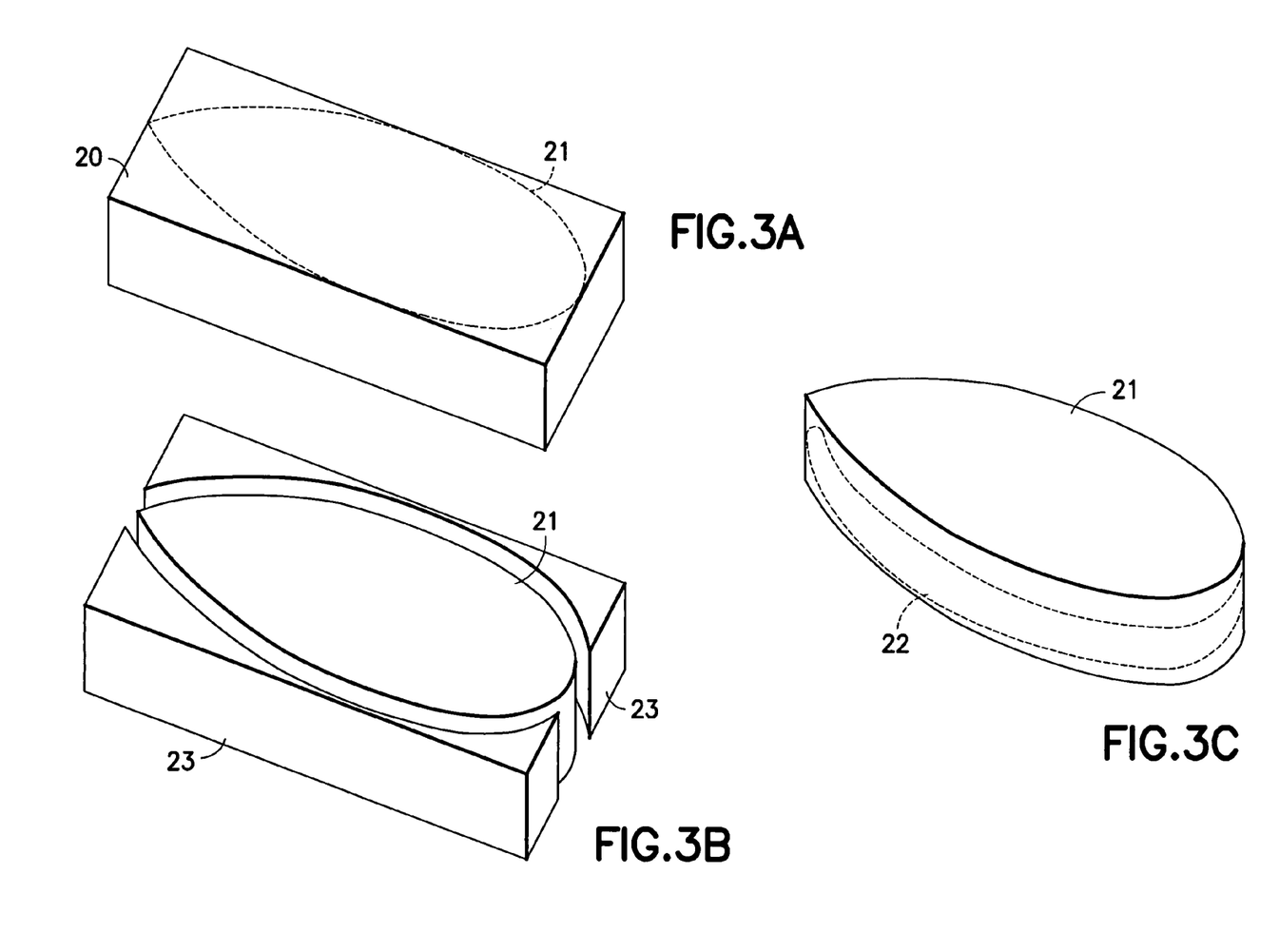
FIGS. 3A, 3B and 3C are schematic perspective views showing the tasks involved in cutting a high-density segment of ethyl vinyl acetate to a shape which is that of a surfboard.
Figures 3D, 3E, 3F:
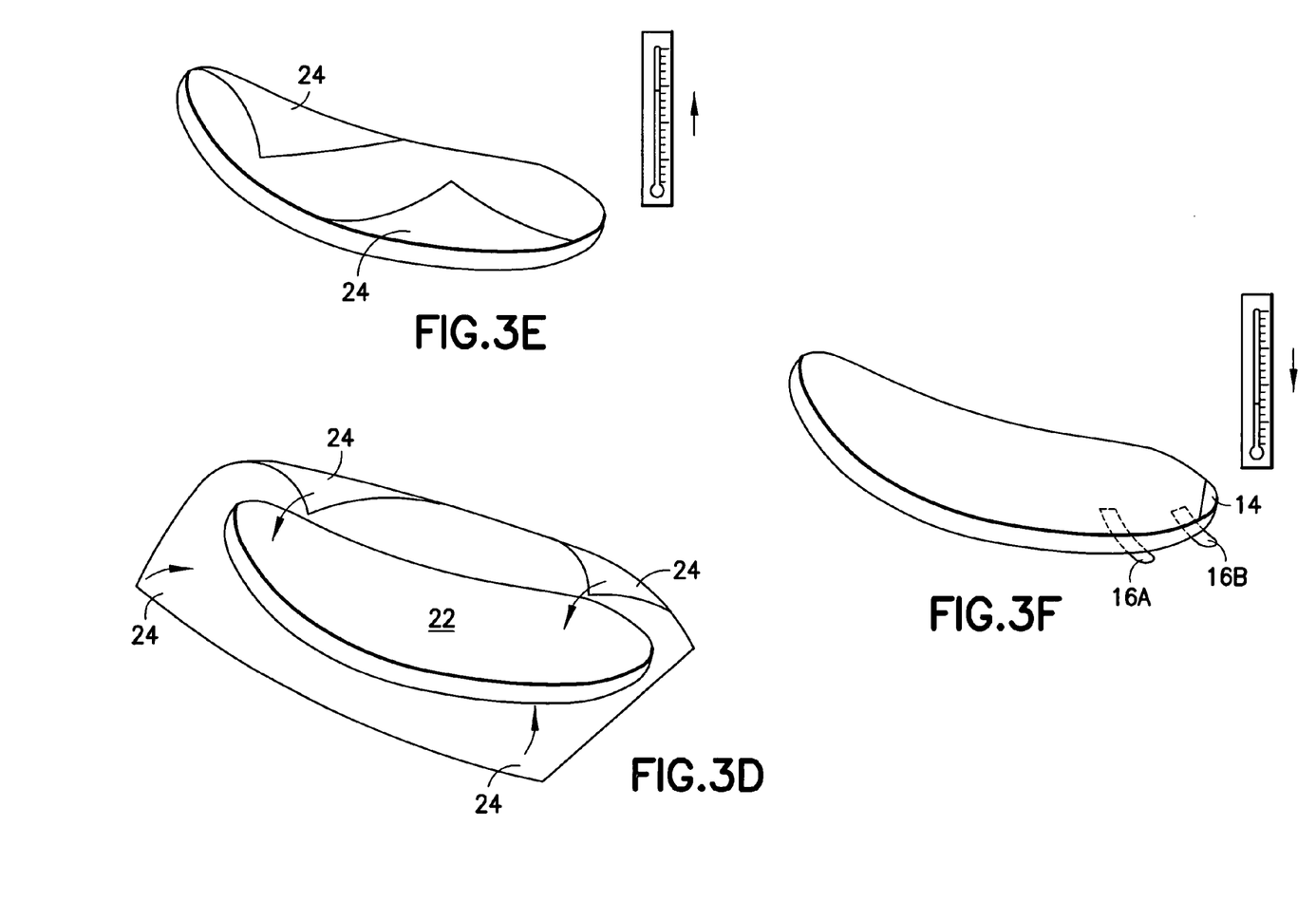
FIG. 3D is a schematic perspective view showing the step of wrapping the high-density ethyl acetate, shaped as a surfboard, in a polyethylene shell.
FIG. 3E is a schematic perspective view showing the step of heating the surfboard, after having wrapped it in polyethylene shell for bonding to the high-density ethyl vinyl acetate.
FIG. 3F is a schematic perspective view showing the step of cooling the surfboard subsequent to the heating step.

FIGS. 3A–3C schematically show the tasks of cutting a segment 20 of high-density ethyl vinyl acetate to form a first blank 21 and scrap material 23. As seen in FIG. 3C, the first blank 21 can then be cut or machined down to form the surfboard core member 22. FIG. 3D schematically shows the step of wrapping the high-density ethyl vinyl acetate core member 22 in a polyethylene shell or cover 24 for a sufficient heating time and at a temperature sufficient for bonding the polyethylene shell 24 to the high-density ethyl vinyl acetate core 22, such as approximately 15–30 minutes for example. Finally, FIG. 3F schematically illustrates a subsequent cooling step and attachment of fins 16A, 16B.

Figure 4:
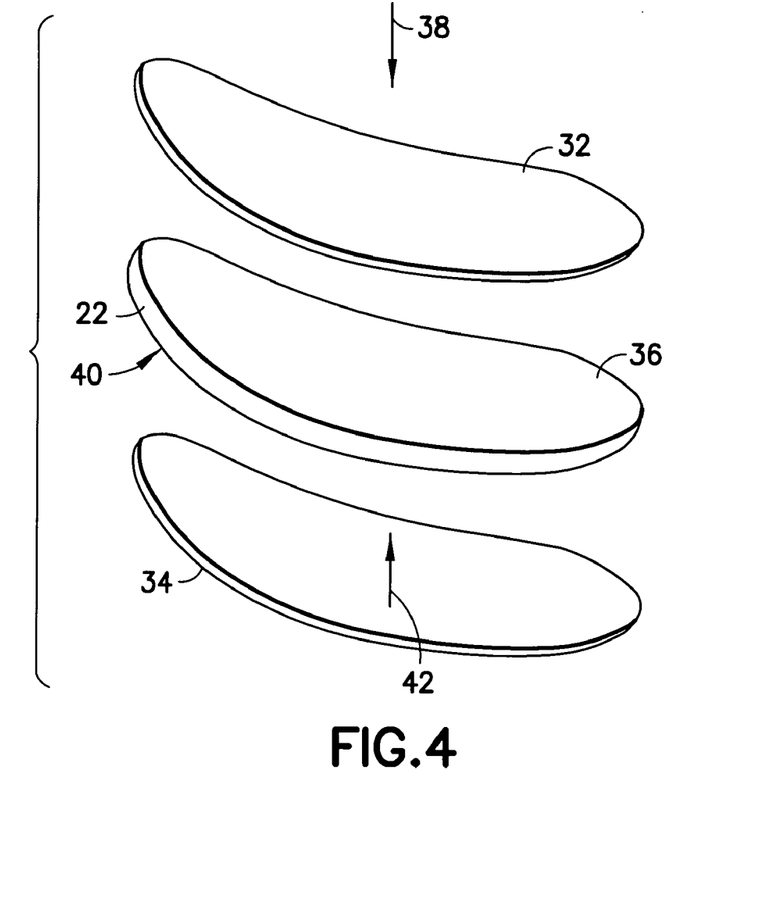
FIG. 4 is a perspective view showing positioning of components used to manufacture an alternate embodiment of the present invention.
Figure 5:
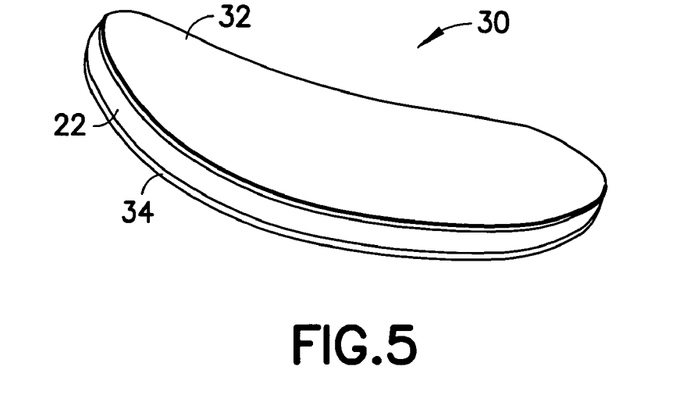
FIG. 5 is a perspective view of the surfboard manufactured from the components shown in FIG. 4.
Figure 6:
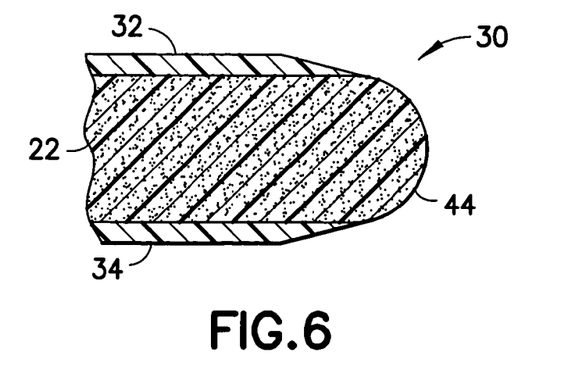
FIG. 6 is a partial cross sectional view of the surfboard shown in FIG. 5.

Referring also to FIGS. 4–6 an alternate embodiment of the invention is shown. In this embodiment the surfboard or sports board 30 comprises the core 22, a first top member 32 and a second bottom member 34. The core 22 is preferably comprised of high-density ethyl vinyl acetate, but any suitable foam core material could be used. The top and bottom members 32, 34 are both preferably comprised of a polyethylene sheet material which is harder than the material of the core 22. The top and bottom members 32, 34 have a general surfboard shape similar to the core 22.

The top member 32 is located against the top side (the top major side) 36 of the core 22 as indicated by arrow 38. The bottom member 34 is located against the bottom side (the bottom major side) 40 of the core 22 as indicated by arrow 42. This assembly is then heated. The top and bottom layers and the core melt slightly and then the assembly is cooled (such as at room temperature for example). This permanently bonds the top member 32 to the top side 36 and the bottom member 34 to the bottom side 40. Pressure can be applied to the assembly during heating. This results in the sandwich configuration as shown in FIGS. 5 and 6.

As seen in FIG. 6, the core 22 has an edge or bumper 44 which is exposed and extends outward past the side edges of the top and bottom members 32, 34. The edge 44 can be machined to have a curved or bull-nose shape. However, any suitable shape could be provided. The edges of the cover members 32, 34 could also be machined to a desired shape, such as the beveled shape shown. In one type of alternate embodiment and additional resilient bumper or flexible cover material could be attached over the edge 44. However, in the preferred embodiment shown the edge 44 is exposed along its entire perimeter length.

With the present invention, a portion of the core 22 extends past a perimeter side edge of the first and second members 32, 34. The exposed edge 44 is located at an outer edge of the surfboard extending from between the top and bottom members 32, 34. The edge 44 forms a perimeter edge of the surfboard 30. With the present invention, because the first and second cover members are comprised of a different harder material than the core member, and because the side edge 44 of the core member extends from between the first and second cover members and past the first and second cover members, a relatively soft perimeter edge portion is formed on the surfboard. Thus, a side bumper is formed from the core to form the relatively soft perimeter edge portion. However, the top and bottom members 32, 34 can still provide stiffener properties to the core to prevent the core from breaking too easily.

In an alternate embodiment a portion of one or both of the cover members 32, 34 could wrap around the sides of the core 22, but the core 22 preferably forms a majority of the side perimeter of the surfboard. In another alternate embodiment, one or more internal stiffeners could be provided inside the core. Features of the present invention could also be used in other types of sports boards, such as a wake board, a skim board, a snow board, a snow sled or toboggan, etc. In another alternate embodiment, a separate member comprised of resilient relatively soft material could be attached to the side edge perimeter of the surfboard to form the side bumper. In another embodiment, one or more of the layers 32, 34 could additionally or alternatively be attached to each other and/or the core 22 by heat lamination and pressure, or glue, or merely steam heating.

Figure 7:
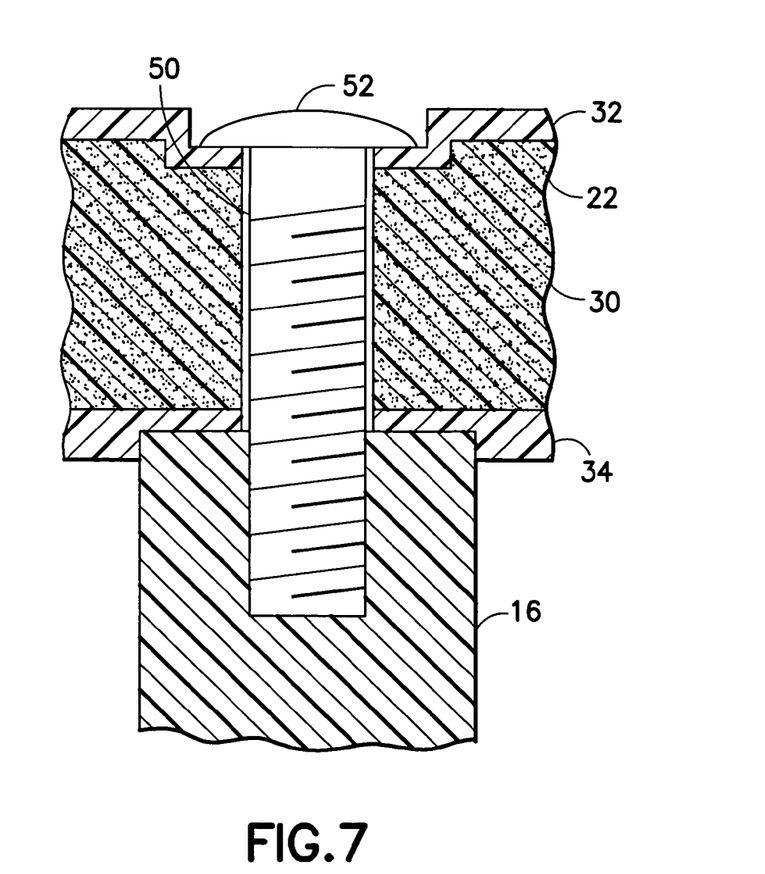
FIG. 7 is an enlarged partial cross sectional view of the surfboard shown in FIG. 5 showing attachment of the fins.

Referring also to FIG. 7, fin receptacle holes 50 (only one of which is shown) are drilled in board to accept the fins 16 and the fin mounting fasteners 52, such as screws. Various embodiments of fins and fin systems can be used. Different drilling methods or other hole forming methods may be used including standard drills and hot melt drills. The main body of the board includes holes 50, which extend through the main body between the top side and the bottom side; through all three layers 22, 32, 34. The holes 50 are located at the bottom rear end of the board 30. The holes 50 are provided for fasteners 52 to attach the fins 16 to the rest of the board. In the embodiment shown, the main body comprises six of the holes 50; two holes for each of the three fins 16. In alternate embodiments, the main body could comprise more or less than six holes and the surfboard could comprise more or less than three fins. Two of the fasteners 52 are provided for each one of the fins 16. The fasteners 52 extend through the holes 50 and screw into the top ends of the fins 16. The fins 16 can, thus, be fixedly and stationarily attached to the bottom side of the main body at the rear end. In addition, any suitable system for attaching the fins to the main body could be provided. For example, fins may also be attached via a fin box system, where the fin box is a receptacle and the fins attach thereto. The mold may need to be modified to accept the fin system. Similarly, a removable fin system may also be employed.

Figure 8:
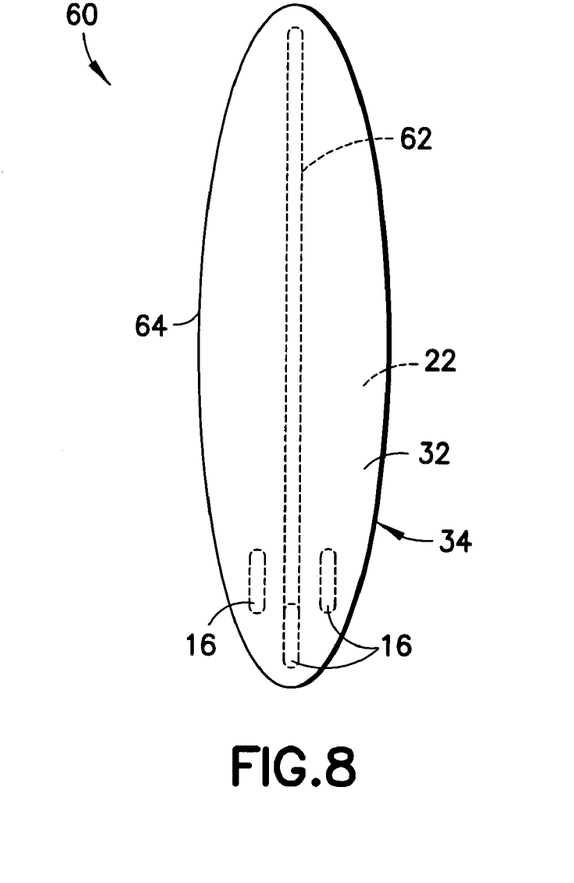
FIG. 8 is a top plan view of an alternate embodiment of the surfboard shown in FIG. 5 with an internal stringer.
Figure 9:
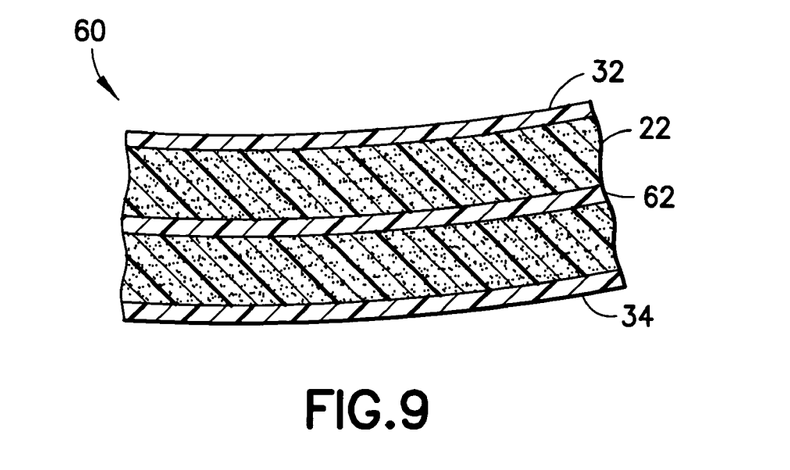
FIG. 9 is a partial cross sectional view of the surfboard shown in FIG. 8.

Referring also to FIGS. 8 and 9, one or more internal stringers 62 may be inserted, through any one of a variety of methods and with different tools/machinery, to form a board 60. Preferably, the stringer 62 is inserted into the foam layer 22 prior to molding, but may also be inserted after the outer layers 32, 34 are molded with the core 22. The stringer(s) 62 function as a stiffener. The internal stringer/stiffener can be made of various materials, such as wood, plastic, carbon fiber, etc.

The strengthening stiffener 62, in the embodiment shown, comprises a metal rod which extends the length of the main body 64 and is centered inside the main body 64 between the front and rear of the main body. In an alternate embodiment, the strengthening stiffener could be comprised of wood, plastic or other suitable material or combinations of materials. In addition, the strengthening stiffener could comprise any suitable shape, and is not limited to a straight rod shape. For example, the strengthening stiffener could have a curved rod shape or could have a general flat two dimensional pattered shape, or even a short height three-dimensional shape. As one example, the strengthening stiffener could comprise a center rod section with branch sections extending from the center rod section.

As noted above, the surfboard 60 comprises a stringer strengthened surfboard having a polyethylene outer shell or layer(s) with a form core. With the addition of the strengthening stiffener 62 and in combination with one or more outer layers 32, 34, the present invention allows a foam core surfboard to be manufactured which can withstand the forces encountered during surfing without a substantial likelihood of the surfboard breaking.

One method of manufacturing the surfboard 10 can comprise the core foam material being cut to shape. A wood, plastic or other material stringer 62 can be inserted into the core foam material. The outer layers 32, 34 could then be heat bonded to the core layer. The heat bonding could also bond the stringer with the core material and/or one or more of the outer layers (32, 34). The present invention could also comprise formation of the surfboard without an internal stringer. For example, the surfboard could be formed with an externally mounted strengthening member(s) extending parallel to the longitudinal axis of the surfboard, or alternatively without the addition of an additional strengthening member. An embodiment could also be provided with a stringer that does not extend substantially an entire length of the surfboard.

With the present invention, the strengthening member can be completely encased inside the inner core 22; such as with one or more of the outer layers 32, 34 closing over an entrance to the inner core. No additional locating members for locating the strengthening member relative to the foam core is needed. With the addition of heat, such as through a steam process for example, the foam core can be permanently attached to the outer layers at substantially the same time while also fixedly locating the strengthening member inside the inner core at substantially the same time. The foam core, stringer, and/or outer layers can melt slightly and bond with one another. Thus, a single heating process is needed to form the surfboard. The step of heating simultaneously attaches the strengthening member, thereby eliminating the need for an extra step to attach a strengthening member. This can obviously save time and money during the manufacturing process. Features of the present invention could be used to form a surfboard without a stiffener (internal or external stiffener).

The board may be decorated with heat laminated graphics and/or indicia, such as a logo, either in or out of the mold. Heating the graphic can permanently bond it into the PE layer through heat fusion. The graphic can now part of the PE layer. Advantages of this process are permanence of the decoration and resistance to weather, wear, etc. MoldIn Graphics Systems of Clarkdale, Ariz. offers permanent labeling, decorating and enhancement technologies for rotational molding, thermoforming, vacuum forming, blow molding, injection molding, pressure forming and compression forming. In-mold graphics designed specifically for the rotational molding industry is provided with MOLD-IN GRAPHICS® and have become a popular way to permanently decorate polyolefin products. Highly visible, multi-colored and permanent subsurface graphic transfers embed directly into rotationally molded polyolefin resins during the molding process. It is recognized for a durable graphic system, and MOLD-IN GRAPHICS® are resistant to attack by chemicals, solvents and exposure to extreme weather conditions. MOLD-IN GRAPHICS® was originally designed for use with rotational molding only, however, it has been discovered that MOLD-IN GRAPHICS® can be used with the present invention to in-mold graphics at the same time the outer layer(s) are molded with the inner core.

The graphics can be heat transferred into one or both of the outer layers 32, 34 of the present invention. The graphics can be permanently bonded into the layers 32, 34 during heating of the layers with the core layer inside the heating mold. Alternatively, or additionally, the graphics can be heat bonded to the layer(s) 32, 34 after the board is removed from the mold, such as with a heat gun or heating torch. Because the graphics are heat bonded into the layer(s) 32, 34, a portion of the layer(s) 32, 34 would need to be removed in order to remove the graphics from the board. Therefore, this type of process provides a permanent graphics marking of the board; perhaps in a same step as when the layers (32, 34 are heat bonded with the core layer 22. However, heat bonded graphics need not be provided.

As an alternative to MOLD-IN GRAPHICS® GE Plastics is also capable of producing in-mold graphics. In a preferred embodiment the graphics are permanent, but might not be permanent if a less expensive board to manufacture is desired. In alternate embodiments, graphics or indicia could be screened onto the board, or embossed into the board, or perhaps even sublimation of the graphics into the board could be provided.

Textural surfaces can also be added through different products and methods. Such surfaces may be created during the molding process of attaching the outer layers 32, 34 to the inner core 22, or through heat transfer processes during or after molding. Textured surface can act to improve foot traction on board and create a non-slip surface. A separate traction pad could be heat molded into the top layer 32 or to the core 22 through a hole in the top layer 32. This heat molding could occur at the same time the layers 32, 34 are attached to the core 22.

In a preferred embodiment, the board is formed with the outer perimeter or edge 44 of the inner foam core 22 forming a relatively soft bumper specifically, for example, for use as a beginner's surfboard. However, the bumper feature of the invention could be used in non-beginner surfboards also. This provides an added measure of safety. More specifically, during surfing the surf board can sometimes hit the surfer when the surfer falls off of the board (or can hit another surfer, or a swimmer). By providing the bumper edge 44 of relatively soft material, there is less risk that the surfer will suffer serious injury; particularly less risk that the surfer will surfer a serious head injury. Less injury to the surfer will allow the surfer to enjoy the surfing experience better. The bumper edge is particularly advantageous at the front end of the board; especially for safety of other surfers or swimmers. The fins could also be comprised of rubber or another soft material. The bumper need not be the same size around the perimeter of the board. For example, the bumper could be larger at the front or nose of the surfboard. As another example, the bumper might not be provided at predetermined areas of the surfboard, such as at small lateral side areas of the surfboard. This can be varied merely by varying the size and/or shape of one or both of the top and bottom layers 32, 34.

The process of manufacturing the surfboard can be less expensive than a comparable surfboard with the same features. More specifically, no additional step is required to attach a bumper to the surfboard. The bumper is integrally provided with the form core as a unitary member. The outer layers 32, 34 can be attached to the foam core at the same time the stringer and/or the graphics and/or the traction layer are attached. This can save manufacturing time and can be less expensive than doing these step separately. Besides being purchased for beginners, this type of less expensive board can also be purchased to be kept at a vacation home or as a guest board for use by visiting guests.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for manufacturing a surfboard comprising:
   providing a first member having a general surfboard shape, the first member comprising high-density ethyl vinyl acetate;
   locating a second member on a first exterior side of the first member, wherein the second member comprises polyethylene and has a relatively thin layer shape;
   heating the first and second members to bond the polyethylene second member to the high-density ethyl vinyl acetate first member; and
   after the second member has been bonded to the first member, cooling the first and second members, wherein a portion of the first member extends past a perimeter side edge of the second member and is left exposed at a side edge of the surfboard.

2. The method for manufacturing a surfboard as in claim 1 further comprising sculpturing a side edge of the first member to a desired rounded shape after the first and second members have been cooled.

3. The method for manufacturing a surfboard as in claim 1 further comprising adding a kicktail to said surfboard.

4. The method for manufacturing a surfboard as in claim 1 further comprising locating a third member on a second opposite side of the first member, wherein the third member comprises polyethylene and is bonded to the first member during heating.

5. The method for manufacturing a surfboard as in claim 4 wherein an exposed edge of the first member is located at an outer edge of the surfboard extending from between the first and second members.

6. The method for manufacturing a surfboard as in claim 1 wherein the first and second members are heated for about 15–30 minutes.

7. A method for manufacturing a surfboard comprising:
   providing a core member having a general surfboard shape;
   locating at least one cover member on opposite first and second major sides of the core member, wherein the at least one cover member is comprised of a different material than the core member; and
   heating the core and cover members to bond the at least one cover member to the core member,
   wherein at least a portion of a side edge of the core member extends outward past the at least one cover member and is left exposed at a side edge of the surfboard.

8. The method as in claim 7 wherein the core member comprising high-density ethyl vinyl acetate.

9. The method as in claim 8 wherein the at least one cover member comprises at least one polyethylene sheet member.

10. The method as in claim 7 wherein the at least one cover member comprises a first polyethylene cover member on a first major side of the core member and a second polyethylene cover member on a second opposite side of the core member.

11. The method as in claim 10 wherein the side edge of the core member extends outward from between the first and second cover members to form a perimeter edge of the surfboard at the side edge of the surfboard.

12. A surfboard comprising:
   a high-density ethyl vinyl acetate core member;
   a first polyethylene cover member melt bonded to a first side of the core member; and
   a second polyethylene cover member melt bonded to a second opposite side of the core member,
   wherein a side edge of the core member extends from between the first and second cover members and past the first and second cover members, wherein the side edge of the core member is not covered to form an exposed perimeter edge of the surfboard.

13. A surfboard comprising:
   a core member;
   a first cover member bonded to a first side of the core member; and
   a second cover member bonded to a second opposite side of the core member,
   wherein the first and second cover members are comprised of a different harder material than the core member, and wherein a side edge of the core member extends from between the first and second cover members and past the first and second cover members to form a relatively soft perimeter edge portion of the surfboard directly exposed at a side edge of the surfboard.

14. A surfboard as in claim 13 wherein the core member comprises high-density ethyl vinyl acetate, and wherein the cover members comprises polyethylene sheet members.

15. A surfboard as in claim 13 wherein the first and second cover members form top and bottom sides of the surfboard and form strengthening members to form a general bonded sandwich shape with the core member and prevent the core member from breaking.

16. A surfboard comprising:
 a surfboard core;
 a first top side member bonded to a top side of the core;
 a second bottom side member bonded to an opposite bottom side of the core;
 and a side bumper extending from the core between the first and second cover members and past the first and second cover members to form a relatively soft perimeter edge portion of the surfboard, wherein the side bumper comprises a portion of the core which is comprised of a material which is softer than the top and bottom side members, and wherein the portion of the core is not covered such that the core is directly exposed at the edge portion of the surfboard.

* * * * *